United States Patent [19]
Denley

[11] Patent Number: 5,897,202
[45] Date of Patent: Apr. 27, 1999

[54] DEVICE FOR DIRECTING AND INDICATING THE POSITION OF AN AUTOMOTIVE HEADLAMP REFLECTOR

[75] Inventor: Ronald S. Denley, Woodstock, Ill.

[73] Assignee: Elco Textron Inc., Rockford, Ill.

[21] Appl. No.: 08/831,663

[22] Filed: Apr. 9, 1997

[51] Int. Cl.⁶ .............................. B60Q 1/06; G01B 5/24; G01B 5/25; G01D 21/00
[52] U.S. Cl. ........................................... 362/463; 362/460
[58] Field of Search .............................. 362/61, 66, 287, 362/460, 463

[56] References Cited

U.S. PATENT DOCUMENTS

| | | | |
|---|---|---|---|
| 4,893,219 | 1/1990 | Lisak | 362/66 |
| 5,068,769 | 11/1991 | Umeda et al. | 362/61 |
| 5,077,642 | 12/1991 | Lisak | 362/66 |
| 5,091,829 | 2/1992 | Hendrischk et al. | 362/61 |
| 5,319,529 | 6/1994 | Lukkarinen et al. | 352/66 |
| 5,321,589 | 6/1994 | Shinkawa et al. | 362/66 |
| 5,351,170 | 9/1994 | Nagengast et al. | 362/66 |
| 5,355,287 | 10/1994 | Denley | 362/66 |
| 5,446,632 | 8/1995 | Childs et al. | 362/66 |
| 5,452,185 | 9/1995 | Arlon et al. | 362/287 |
| 5,622,421 | 4/1997 | Turley, Jr. et al. | 362/66 |
| 5,701,783 | 12/1997 | Lin | 362/66 |
| 5,707,133 | 1/1998 | Burton | 362/66 |

*Primary Examiner*—Stephen Husar
*Assistant Examiner*—Matthew J. Spark
*Attorney, Agent, or Firm*—Trexler, Bushnell, Giangiorgi & Blackstone, Ltd.

[57] ABSTRACT

A device for adjusting an automotive headlamp reflector to a desired position and indicating a variance in the actual position of the headlamp reflector from the desired zero position. The device includes a directing member which can be operatively engaged with the reflector. An input shaft is provided in operative communication with the directing member, and the shaft, when rotated, can move the directing member in order to move the reflector to the desired position. A rotatable platform is disposed about the shaft. A planetary gear arrangement is provided which engages a gear on the shaft and includes an outer ring gear. Indicia is provided for indicating a position of the ring gear with relation to a position of the platform in order to indicate variance in the actual position of the headlamp reflector from the desired position. The platform is also movable without disengaging any of the gearing, and also without movement of the input shaft and the directing member, which movement can be employed to re-align the indicia to a zero position, after the device has been operated to attain the desired position for the reflector member.

20 Claims, 4 Drawing Sheets

DEVICE FOR DIRECTING AND INDICATING THE POSITION OF AN AUTOMOTIVE HEADLAMP REFLECTOR

BACKGROUND OF THE INVENTION

The present invention relates generally to devices for changing the aiming of automotive headlamps, and relates more specifically to devices for directing an automotive headlamp reflector to a desired position and for indicating any variations of the actual position of the automotive headlamp reflector from the desired position, as set at the factory.

Modern day headlamps for vehicles have been engineered and designed to be aerodynamically efficient. In this regard, the headlamps are designed as sealed assemblies wherein the portion of the headlamp approximate the outer surface of the automobile is relatively stationary, and is aerodynamic. A headlamp assembly normally includes: a fixed housing, to which an outer headlamp lens is affixed; a movable reflector, which is mounted within the fixed housing; and a stationary headlamp bulb, which is positioned within the movable reflector. Typically, the movable reflector is mounted to the housing by a number of universal or ball-type pivots which are stationary, or fixed, on the housing. A first pivot point and adjustor mechanism is generally disposed vertical of the fixed pivot, and a second pivot point and adjustor mechanism is generally disposed horizontal of the fixed pivot. As such, the movable reflector may be pivoted about the fixed pivot in the vertical and horizontal planes to aim the headlamp beam. The first and second pivot points, normally termed the vertical pivot and the horizontal pivot, are typically provided by mechanical adjustor mechanisms which effect movement of the reflector in the horizontal and vertical planes. These adjustor mechanisms normally employ an adjustor screw, or other similar component, to effect linear movement. The adjustor mechanisms are typically mounted to the housing of the headlamp assembly and are typically operatively connected to the movable reflector by ball and socket type pivots, or the like, such that linear movement of the adjustor screw will produce pivoting of the removable reflector in the horizontal and vertical planes. In this manner, the adjustor mechanisms can be used to adjust the aim of automobile headlamp beams.

Before an automobile is released to the consumer, the movable reflectors of the headlamp assemblies are adjusted to a desired position so that the headlamp beams are properly aimed in both the vertical and horizontal directions. To this end, adjustor mechanisms are normally operated at the automobile assembly plant.

Once proper vertical and horizontal aiming of the headlamps are attained and before the automobile is released to the consumer, vertical and horizontal indicators on each adjustor mechanism are manipulated to provide a visual indication that each movable reflector is in the desired, or "zero", position. The indicators either naturally transmit, or are adjusted in some manner in order to transmit, a visual indication of the zero position. Thereafter, if a movable reflector moves from its desired position, due, for example, to vibration, jarring, or the vehicle being in an accident, a mechanic can use the visual indication to determine that the movable reflector is no longer in its desired position. Then, the mechanic can operate the adjustor mechanisms in order to return the horizontal and vertical indicators to the zero positions, which should properly align the reflector.

The Department of Transportation of the United States Government has set forth specific guidelines dealing with vehicle headlamp aiming and indicating mechanisms in both the horizontal and vertical directions. These guidelines have been issued under regulation FMVSS 108, and relevant portions of these guidelines are set forth briefly hereinafter, wherein the degree of accuracy required of the horizontal and vertical indicators is apparent. The relevant portions of the regulation state as follows:

On-vehicle aiming.

Each headlamp system that is capable of being aimed by equipment installed on the vehicle shall include a Vehicle Headlamp Aiming Device (VHAD) that conforms to the following requirements:

(a) Aim.

The VHAD shall provide for headlamp aim inspection and adjustment in both the vertical and horizontal axes.

(1) Vertical aim:

The VHAD shall include the necessary references and scales relative to the horizontal plane to assure correct vertical aim for photometry and aiming purposes. An offvehicle measurement of the angle of the plane of the ground is permitted. In addition, an equal number of graduation form the "0" position representing angular changes in the axis in the upward and downward directions shall be provided.

(I) Each graduation shall represent a change in the vertical position of the mechanical axis not larger than 0.19 degree (1 in. At 25 ft.) to provide for variations in aim at least 1.2 degrees above and below the horizontal, and have an accuracy relative to the zero mark of less than 0.1 degree.

(2) Horizontal aim.

The VHAD shall include references and scales relative to the longitudinal axis of the vehicle necessary to assure correct horizontal aim for photometry and aiming purposes.

An "O" mark shall be used to indicate alignment of the headlamps relative to the longitudinal axis of the vehicle. In addition, an equal number of graduations from the "O" position representing equal angular changes in the axis relative to the vehicle axis shall be provided.

(I) Each graduation shall represent a change in the horizontal position of the mechanical axis not greater than 0.38 degree (2 in. at 25 ft.) to provide for variations in aim at least 0.76 degree (4 in. at 25 ft.) to the left and right of the longitudinal axis of the vehicle, and shall have an accuracy relative to the zero mark of less than 0.1 degree.

With regard to the vertical aiming indicator, a popular form of indicator in the industry is a spirit or bubble level which is mounted to the movable reflector component of the headlamp assembly and is viewable through the lens or an opening in the stationary headlamp housing. The mounting of the bubble level is typically adjustable so that once the desired zero vertical positioning of the headlamp is attained, the bubble level can be "zeroed out", that is, adjusted so that the bubble is at the zero indicia. As such, any subsequent movement of the movable reflector from the desired vertical position will produce a movement in the bubble. Consequently, a mechanic will have an immediate visual indication that the vertical aiming of the headlamp is out of adjustment.

While a bubble level can operate and provide sufficient indication in the vertical plane, it can be appreciated that a bubble level cannot provide an indication in the horizontal plane. Therefore, the industry has developed a number of different types of horizontal adjusting and indicating mechanisms for use with movable reflectors. For example, U.S. Pat. No. 5,091,829 discloses a horizontal adjusting and indicating mechanism wherein an adjusting wheel is affixed to a threaded shaft such that turning the adjusting wheel rotates the threaded shaft. The rotation of the threaded shaft causes a headlamp reflector to move. Because the adjusting wheel is meshed with a toothed wheel, rotating the adjusting wheel also causes the toothed wheel to rotate. The toothed wheel is provided with a scale which cooperates with a pointer to indicate, in effect, the positioning of the headlamp reflector. In order to provide that the scale on the toothed wheel correctly indicates the desired positioning of the automotive headlamp reflector, the adjusting mechanism provides that the toothed wheel can be disengaged from the adjusting wheel, turned to the "zero" position, and then re-meshed with the adjusting wheel. As a result, the ability of the scale on the toothed wheel to precisely indicate the zero position of the automotive headlamp reflector is limited by the meshability of the toothed wheel and the adjusting wheel when the toothed wheel has been turned to its zero position. Additionally, the fact that the toothed wheel must be brought out of mesh with the adjusting wheel after the reflector is moved to the desired location provides that the toothed wheel becomes a loose part. Therefore, the toothed wheel is subject to, for example, breaking upon re-engagement with the adjusting wheel. Furthermore, because the toothed wheel and adjusting wheel are not coaxial, the adjusting mechanism disclosed in U.S. Pat. No. 5,091,829 is not extremely compact or accurate within the guidelines noted above.

Other horizontal indicators in the prior art suffer from similar disadvantages such as not meeting the required governmental standards for accuracy.

The difficulties discussed hereinabove are substantially eliminated by the present invention.

OBJECTS AND SUMMARY OF THE INVENTION

Accordingly, it is an object of the present invention to provide a device for directing an automotive headlamp reflector to a desired position with enough precision that the required federal government standards are met.

Another object of the present invention is to provide a device for indicating a variance in the actual position of an automotive headlamp reflector from a desired position without requiring disengagement of any parts of the device.

Still another object of the present invention is to provide a device for indicating a variance in the actual position of an automotive headlamp reflector from a desired position.

Still a further object of the present invention is to provide a convenient and effective method for directing an automotive headlamp reflector to a desired position and for indicating the desired position.

Yet a further object of the present invention is to provide a convenient and effective method for determining a variance in an actual position of an automobile headlamp reflector from a desired position and for directing the automotive headlamp reflector to the desired position.

By the present invention, it is proposed to overcome the difficulties encountered heretofore. To this end, the present invention envisions a directing and indicating device for directing an automotive headlamp reflector to a desired position and indicating a variance in the actual position of the automotive headlamp reflector from the desired position, where the directing and indicating device comprises a directing member which can be engaged with the automotive headlamp reflector. A rotatable shaft in operative communication with the directing member is provided, and the shaft, when rotated, can move the directing member in order to direct the automotive headlamp reflector to the desired position. The shaft has a gear thereon and a rotatable platform is disposed around the shaft. A planetary gear is engaged with the gear on the shaft, and a ring gear is engageable with the planetary gear. Also provided is means for indicating a position of the ring gear with relation to a position of the platform in order to indicate the variance in the actual position of the automotive headlamp reflector from the desired position whereby movement of the automotive headlamp reflector causes the directing member to move, and the movement of the directing member causes the ring gear to rotate relative to the platform.

A preferred embodiment of the present invention envisions a directing and indicating device for directing an automotive headlamp reflector to a desired position and indicating a variance in the actual position of the automotive headlamp reflector from the desired position, where the directing and indicating device comprises a reciprocatable arm or member which can be connected to the automotive headlamp reflector. A rotatable shaft in operative communication with the arm through a gear arrangement or the like is provided, and the shaft, when rotated, reciprocates the arm in order to direct the automotive headlamp reflector to the desired vertical or horizontal position. A rotatable platform is provided which is coaxial with, and is disposed around, the shaft. The platform has a planetary gear thereon having gear teeth directed radially away from a center of the planetary gear is engaged with the gear on the shaft. The platform also has a stem thereon and the stem extends through the planetary gear thereby preventing the planetary gear from moving linearly relative to the platform and permitting only relative rotation. A ring gear having gear teeth pointed toward a center of the ring gear is meshable with the gear teeth of the planetary gear. Provided on the ring gear or between the ring gear and the platform is means for indicating a position of the ring gear with relation to the position of the platform in order to indicate a variance in the actual position of the automotive headlamp reflector from the desired position, wherein movement of the automotive headlamp reflector causes the arm to reciprocate, and causes the ring gear to rotate relative to the platform. That is to say the means for indicating the relative position of the ring gear is movable. When the platform is rotated, the ring gear rotates relative to the platform due to the meshed engagement of the planetary gears with the ring gear. When the shaft is rotated to direct the automotive headlamp reflector to the desired position, the ring gear rotates relative to the platform in the opposite direction in which the shaft is rotated. Preferably, a structural means is provided for holding the platform relatively stationary while the shaft is rotated, and a retaining or snap ring is slidable onto the shaft for holding the ring gear axially in place and meshed with the planetary gear.

Two methods in accordance with the present invention are also envisioned. A first method comprises a method for directing an automotive headlamp reflector to a desired position and for indicating the desired position. This first method comprises rotating a shaft in operative communication with a directing member where the directing member is engaged with the automobile headlamp reflector. The shaft has a platform disposed therearound, and the shaft has a gear thereon which is engaged with a planetary gear carried by the platform. The planetary gear is engaged with a ring gear, and rotation of the shaft causes the directing member to move and direct the automobile headlamp reflector to the desired vertical or horizontal position and causes the ring gear to rotate relative to the platform. Once the desired vertical and/or horizontal positions are attained in accordance with factory standards and methods, the platform is rotated relative to the ring gear, and the indicator on the platform and ring gear are aligned with the zero position. This rotation of the platform is attained without rotation of the drive shaft or movement of the directing member so that the desired vertical and/or horizontal position for the headlamp reflector is not altered.

Another envisioned method according to the present invention comprises a method for determining a variance in an actual position of an automotive headlamp reflector from a desired position and for directing the automotive headlamp reflector to the desired or zero position. This envisioned method comprises reading indicia between a ring gear and a rotatable platform that the ring gear has rotated relative to the platform and that the actual position of the automotive headlamp reflector has varied from the desired position. The ring gear is engaged with a planetary gear, and the planetary gear is engaged with a gear on a rotatable shaft. The platform is disposed around the shaft, and the shaft is in operative communication with a directing member. The directing member is engaged with the automotive headlamp reflector. Movement of the reflector from the desired position is transmitted into movement of the shaft and the directing member which causes the ring gear to rotate relative to the platform and indicate variance in the actual position of the automotive headlamp reflector from the desired or zero position which was set at the factory. The shaft is then rotated to move the directing member and cause the directing member to direct the automotive headlamp reflector to the desired position which is attained by again aligning the indicia on the ring gear and the platform to the zero position.

BRIEF DESCRIPTION OF THE DRAWINGS

The organization and manner of the structure and function of the invention, together with further objects and advantages thereof, may be understood by reference to the following description taken in connection with the accompanying drawings, wherein.

DESCRIPTION OF THE INVENTION

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 1:
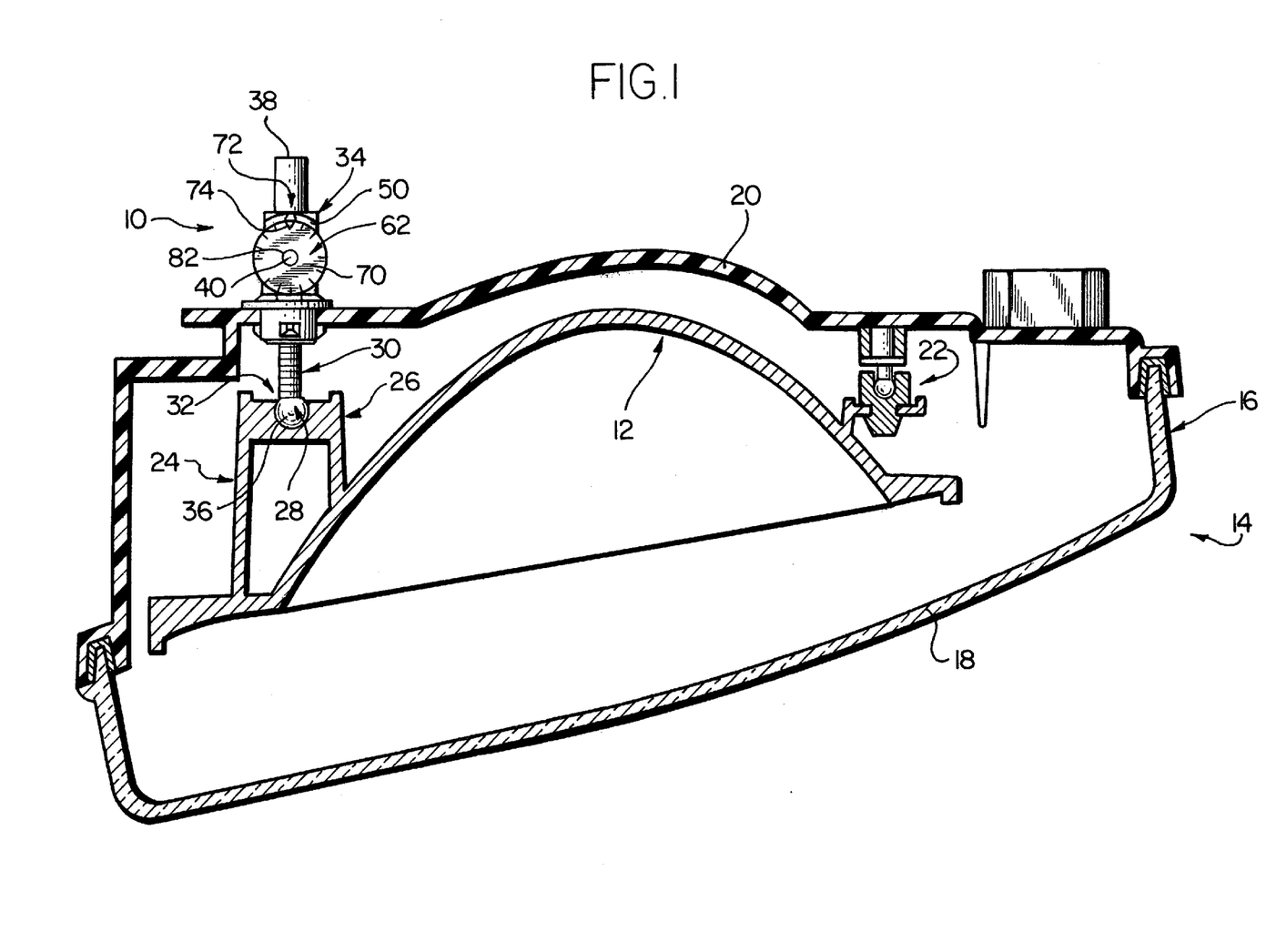
FIG. 1 is a top plan view, partially in section, illustrating a directing and indicating device according to the present invention where the device is connected to an exemplary headlamp assembly.

Shown in the figures is a device 10, in accordance with the present invention, for directing and indicating the position of an automotive headlamp reflector 12. As shown in FIG. 1, the device 10 can be affixed to a typical headlamp assembly 14 which comprises an external housing 16 including a front transparent lens portion 18 and a rear shell 20. Within the external housing 16 of the headlamp assembly 14 is mounted a headlamp reflector 12, and within the headlamp reflector 12 is mounted a headlamp bulb (not shown). To allow aiming of the headlamp beam, the headlamp reflector 12 is mounted for pivotal motion about both its horizontal and vertical axes. It should be noted that FIG. 1 shows only the arrangement for horizontal, or side-to-side, aiming of the headlamp reflector 12; however, one skilled in the art would recognize that the device 10 according to the present invention can also be utilized to conduct vertical, or up-and-down, aiming of the headlamp reflector 12. The headlamp reflector 12 is mounted to pivot about a first or stationary ball joint 22 in response to bidirectional movement of an opposite end portion 24 of the reflector. To this end, the opposite end 24 of the headlamp reflector 12 is formed with a suitable support strut or framelike portion 26 to accept a coupling end 28 of a directing member 30 of the device 10, which directing member is in the form of an adjusting screw in the illustrated embodiment. The directing member 30 of the device 10 and the framelike portion 26 of the headlamp reflector 12 also preferably form a second ball joint 32.

Figure 2:
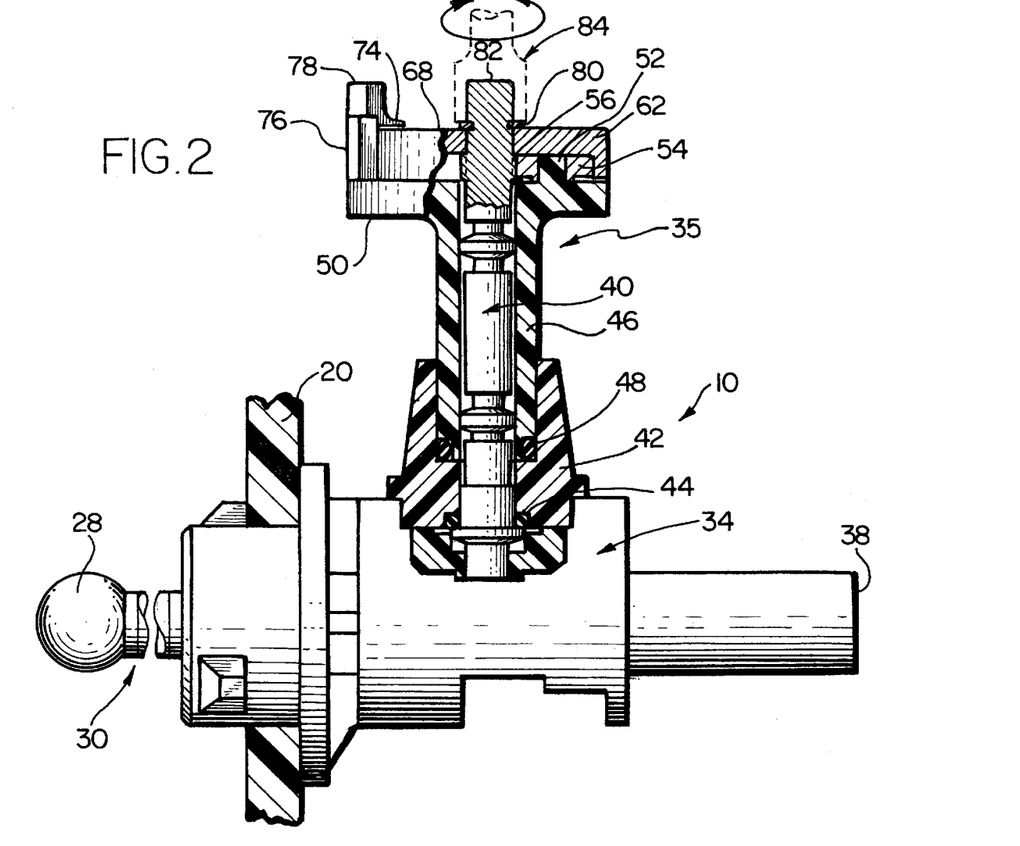
FIG. 2 is a side elevation, partially in section, of the directing and indicating device shown in FIG. 1.

Generally speaking, the device 10 comprises a fixed member or housing 34 which is mounted to the rear shell 20 of the headlamp assembly 14. To more fully seal the device 10 against the rear shell 20, a rubber washer (not shown) may be used therebetween. Alternatively, one skilled in the art would recognize that the fixed housing 34 of the device 10 may be mounted to other fixed surfaces such as to a vehicle frame or the like without departing from the invention. As shown, the coupling end 28 of the directing member 30 of the device 10 may terminate in a ball portion 36 of the second ball joint 32 and an opposite end 38 of the device 10 may, essentially, form a portion of the housing 34 and is preferably shaped to accommodate a portion of the directing member 30 when the directing member 30 is fully retracted as will be more fully described later. Preferably, the end of the opposite end 38 of the device 10 is capped in order to provide that the device 10 is effectively sealed. Further details of the device 10 according to the present invention are shown in FIG. 2, to which reference is now called upon.

Preferably, the device 10 comprises a gear box assembly or the like (not shown), which is well known in the art and is disposed within the housing 34 of the device 10. The gear box assembly generally converts rotation of a shaft 40 into extension and retraction, or reciprocation, of the directing member 30 in order to achieve adjustment and directing of the headlamp reflector 12. Generally speaking, the gear box assembly translates rotational motion of the shaft 40 at right angles into linear or reciprocal movement of the adjusting screw or directing member 30. To this end, bevel gears can generally be utilized.

Figure 3:
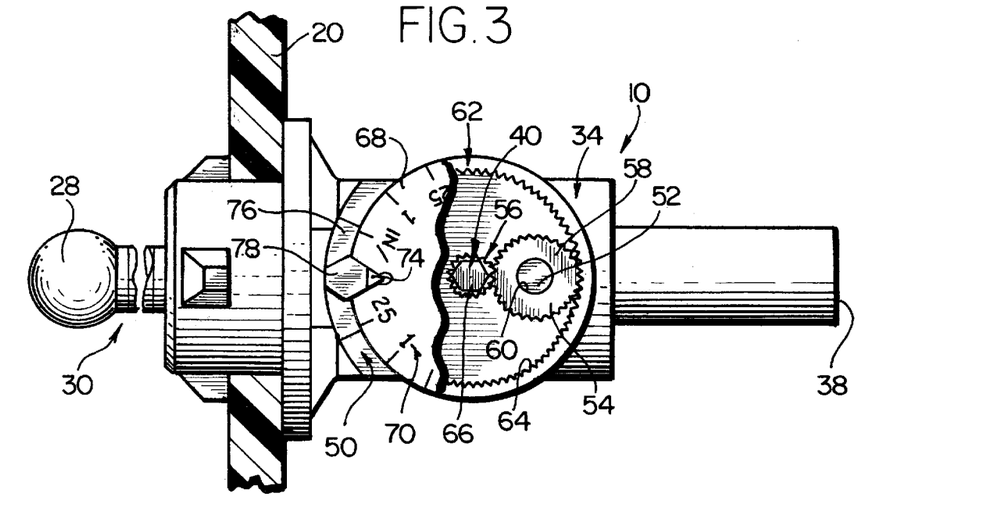
FIG. 3 is a top plan view, partially cut-away to show the engaged gears, of the directing and indicating device shown in FIG. 2.

Affixed to the housing 34 of the device 10 is an indicator arrangement 35 comprised of a number of components to be discussed. Referring to FIGS. 2 and 3, the first is a platform structure support member 42 which is preferably integral with, and formed as an extension of, the housing 34. Therefore, when the shaft 40 is rotated, the platform structure support member 42 remains stationary. Affixed to the platform structure support member 42 is a platform structure 46 which is held frictionally in place both by the platform structure support member 42 and the interaction of a friction member 48, which may be a rubber O-ring. Preferably, the friction holding the platform structure 46 in place relative to the platform structure support member 42 can be overcome such that the platform structure 46 and, therefore, the platform 50 which is integral with the platform structure support member 42 can be positively rotated.

Figures 4, 5:
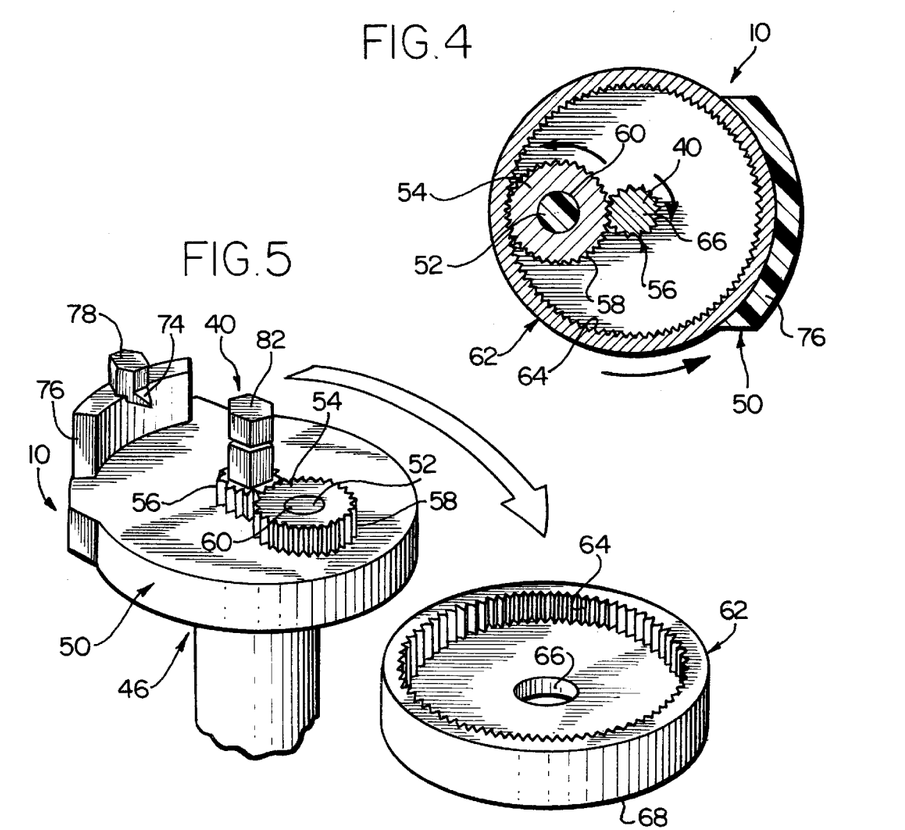
FIG. 4 is a top sectional view of a portion of the directing and indicating device shown in FIG. 2, illustrating movement of gears when the device is utilized to direct an automotive headlamp reflector.
FIG. 5 is a partially exploded perspective view of a portion of the directing and indicating device shown in FIG. 2 illustrating the ring gear disengaged from a planetary gear and in inverted position relative to the platform.

As shown, the rotatable shaft 40 extends through the platform structure 46 and the platform structure support member 42 so that the rotatable shaft 40 can communicate with the directing member 30 and cause the directing member 30 to reciprocate the shaft 40 by means of the gearing within housing 34. As noted, a portion of the platform structure 46 comprises a platform 50, and the platform 50 preferably has a stem 52 thereon upon which a planetary gear 54 is engaged. As shown in FIGS. 3 and 5, the stem 52 extends through the planetary gear 54 to restrict linear movement of the planetary gear 54 relative to the platform 50 when the shaft 40 is rotated. The planetary gear is of course free to rotate relative to the platform. A friction member 44, which may be an O-ring comprised of, for example, rubber, preferably seals the shaft 40 against the platform structure support member 42/housing 34.

Additionally, the rotatable shaft 40 has a gear portion 56 thereon which is meshed with the planetary gear 54. As shown more clearly in FIG. 3, the planetary gear 54 has gear teeth 58 thereon which are directed away from a center 60 of the planetary gear 54. Disposed around, and coaxial with, the rotatable shaft 40 is a ring gear 62, and the ring gear 62 has gear teeth 64 directed toward a center 66 of the ring gear 62. The gear teeth 64 of the ring gear 62 are meshed with the gear teeth 58 of the planetary gear 54.

Figure 6:
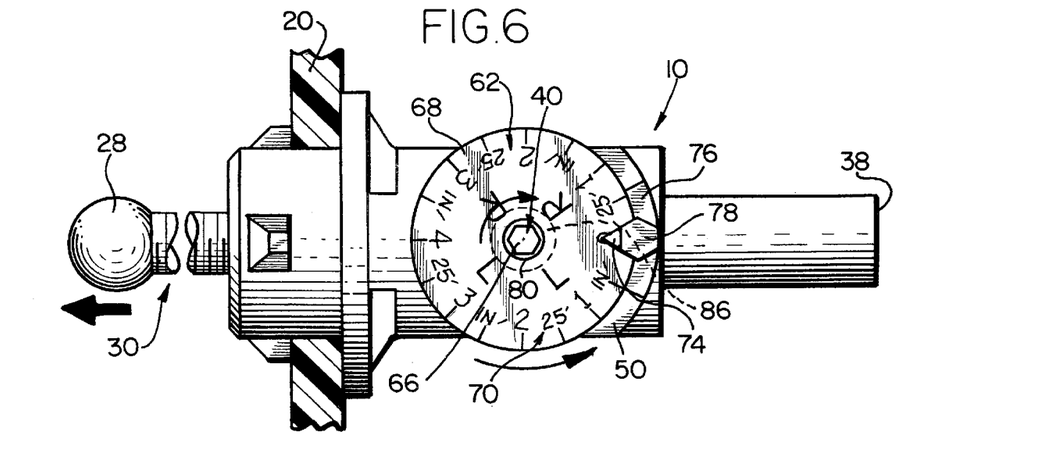
FIG. 6 is top plan view of the directing and indicating device shown in FIG. 2 illustrating rotation of the ring gear upon rotating a shaft to cause the device to direct the automotive headlamp reflector.
Figures 7, 8:
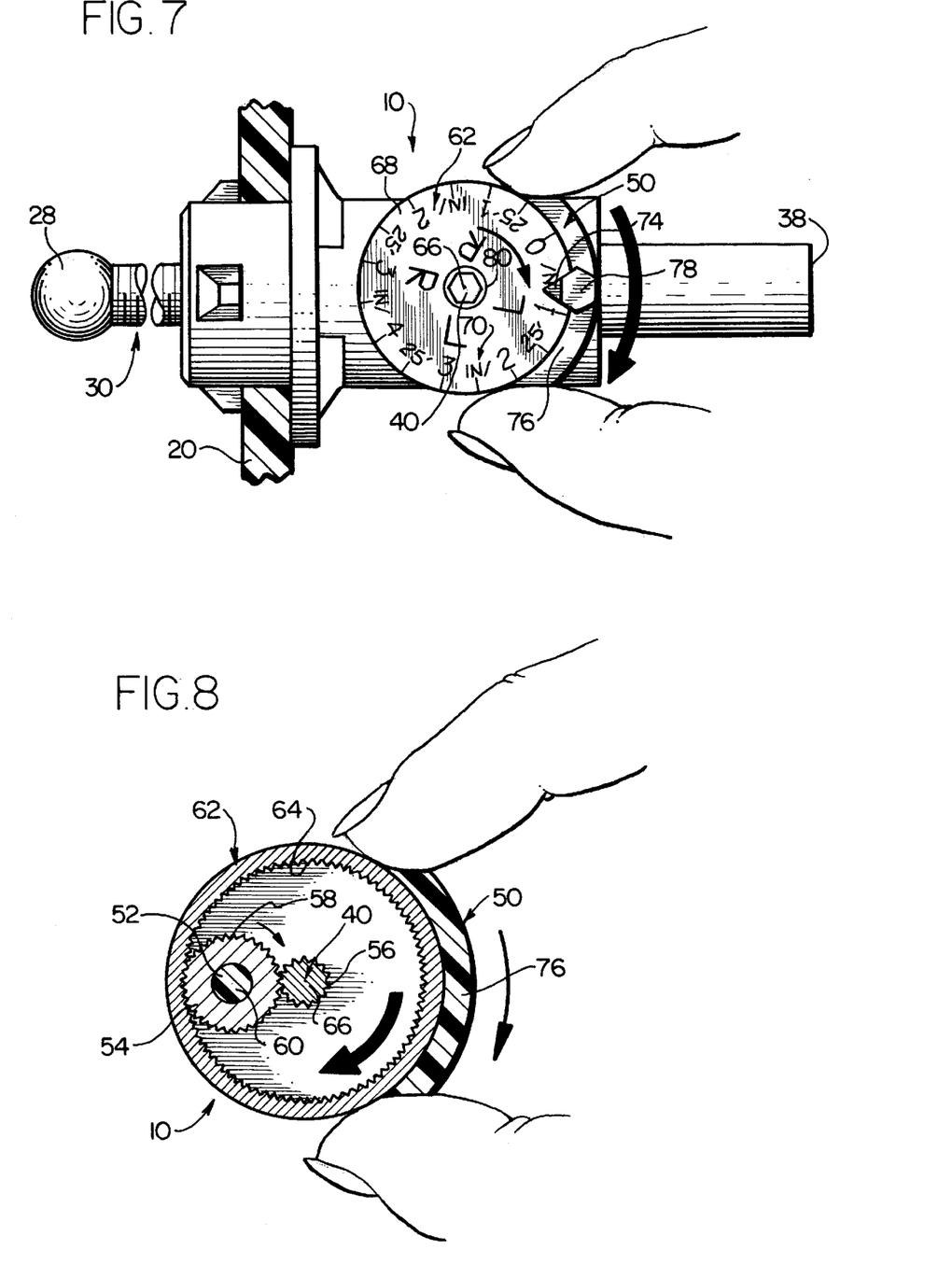
FIG. 7 is a top plan view of the directing and indicating device shown in FIG. 2 illustrating the rotating of the platform and the resulting rotation of the ring gear.
FIG. 8 is a top, sectional view of a portion of the directing and indicating device shown in FIG. 2 illustrating rotation of the planetary gear upon rotating the platform.

Preferably, the top or upper portion 68 of the ring gear 62 is continuous and has an indicia 70 thereon. Additionally, preferably the platform 50 of the platform structure 46 has corresponding indicia 72 thereon, such as a pointer 74. The pointer 74 of the platform 50 may be provided on top of a stage 76 on the platform 50. The platform 50 may be provided with tool engaged means or manual holding means for applying a rotational force to the platform 50. For example, as shown in FIGS. 2 and 5, there may be provided a flange 78 on the stage 76 of the platform 50 for applying rotational force to the platform 50. As shown in FIG. 5, the ring gear 62 may be provided such that the ring gear 62 is disengageable from the platform 50 and the planetary gear 54. However, a slidable C-shaped snap ring 80 as shown in FIGS. 2, 6 and 7, may be provided to retain the ring gear 62 on the platform 50, and in meshed engagement with the planetary gear 54.

While it is preferable that the ring gear 62, the planetary gear 54, the gear 56 on the rotatable shaft 40, and the rotatable shaft 40 be comprised of metal, one skilled in the art would appreciate that any other types of materials can be used. Likewise, while it is preferable that the platform structure 46, the platform structure support member 42, and the housing 34 of the device 10 be comprised of a hard plastic, one skilled in the art would recognize that other types of material could be used.

Operation of the device 10 will now be described. As shown in the figures, a top 82 of the shaft 40 is sized and dimensioned so that the top 82 can be engaged and manipulated by a tool 84 (shown in phantom outline) and effect rotation of the shaft 40. For example, the top 82 of the shaft 40 may be sized and dimensioned so that the shaft 40 can be rotated using a standard socket wrench. As shown in FIGS. 2–6, when the shaft 40 is rotated, this produces rotation of the gear portion 56 on shaft 40. Since the gear portion 56 is engaged with the planetary gear 54, this gear will also rotate. It will be recalled that the planetary gear 54 is carried by the platform 50 for relative rotation. Further since the planetary gear 54 is meshed or engaged with the ring gear 62, the rotation of he shaft 40 is transmitted to the ring gear 62. It should be recalled that rotation of the shaft 40 is used to alter the position of the movable reflector by means of the gearing within housing 34 which produces linear movement of the adjusting screw or directing member 30. Due to the gearing and relative diameters of gear portion 56, planetary gear 54 and ring gear 62, the ring gear 62 rotates in the opposite direction as the shaft 40 rotates while the platform 50 remains stationary. Preferably, the size of the gear 56 on the shaft 40, planetary gear 56 and the ring gear 62 are such that the ring gear 62 rotates at approximately one-fifth the speed at which the shaft 40 is rotated.

While this dimension provides desired precision, it is, of course, not imperative, and one skilled in the art may dimension the elements of the device 10 differently. Preferably, the ring gear 62 rotates in the opposite direction in which the shaft 40 is rotated because of the interaction of the planetary gear 54 with the gear 56 on the shaft 40 and the ring gear 62. FIG. 4 most clearly shows how the planetary gear 54 interacts with the ring gear 62 and the gear 56 on the shaft 40 when the shaft 40 is rotated. As shown, when the shaft 40 is rotated, for example, clockwise, the planetary gear 54 rotates counterclockwise as does the ring gear 62. In much the same manner, if the shaft 40 were rotated counterclockwise, both the planetary gear 54 and the ring gear 62 would rotate clockwise. Rotation of the shaft 40 results in rotation of the planetary gear 54 and the ring gear 62 because of the gear teeth 58 on the planetary gear 54 being meshed both with gear 56 on the shaft 40 and with gear teeth 64 on the ring gear 62. Because the stem 52 on the platform 50 extends through the planetary gear 54, the planetary gear 54 is restrained from moving linearly relative to the platform 50 when the shaft 40 is rotated. When the shaft 40 is rotated, the platform 50 remains stationary due to the platform structure 46 being held frictionally in place by the platform structure support member 42 and the retaining member 48. As mentioned, and as shown in FIG. 6, the ring gear 62 has indicia 70 thereon. Therefore, because the ring gear 62 rotates and the platform 50 remains stationary while the shaft 40 is rotated, the indicia 70 on the ring gear 62 and the pointer 74 on the platform 50 cooperate to indicate that the shaft 40 is being rotated and therefore the directing member 30 is either being extended or retracted. Extension or retraction of the directing member 30 causes the headlamp reflector 12 to pivot about the first ball joint 22. In this manner, the device 10 can be used to direct a headlamp reflector 12 to a desired factory set position to properly aim a headlamp beam.

After the adjustor device 10 has been utilized to direct the headlamp reflector 12 to a desired position, the device 10, and more specifically the arrangement 35, can be adjusted to indicate this desired position and any variance in an actual position of the headlamp reflector 12 from this desired position. It is important to note from the following that movement of the components of the indicator mechanism 35 to attain a zero position indication, is achieved without disconnecting or disengaging any components. The attainment of a zero indicator is achieved merely by means of rotative movement of the platform structure 50 which is permitted by the planetary gear assembly without rotation or movement of the input shaft 40, which remains static due to the inherent prevailing torque of the adjustor device 10.

This function of the device 10 and the indicator arrangement 35 will now be described with relation to FIGS. 7 and 8. After the device 10 has been used to direct the headlamp reflector 12 to the desired, factory pre-set position the respective indicia 74 and 70 most likely will not be in the zero position. To reset the indicia to 74 and 68 to the zero position, the platform 50 is rotated, as shown in FIGS. 7 and 8 and explained hereinafter. To facilitate rotation of the platform 50, means for applying a rotational force to the platform 50 may be provided. As mentioned hereinabove, this means may comprise a flange 78 on a stage 76 which sits on the platform 50. The flange 78 may, like the top 82 of the shaft 40, be sized and dimensioned to receive a tool 84, as shown in FIG. 2, to facilitate rotating the platform 50. For example, the flange 78 may be sized and dimensioned to be manipulated by a standard socket or spanner wrench. Preferably, the platform 50 may be rotated by hand, and hand rotation is what is illustrated in FIGS. 7 and 8. Regardless of how rotation of the platform 50 is facilitated, the platform structure 46 rotates along with the platform 50 since the platform 50 is preferably integral with the platform structure 46. When an adequate rotational force is applied to the platform 50, the frictional force applied on the platform structure 46 by the platform structure support member 42 and the friction member 48 is overcome, thus allowing the platform structure 46 to rotate while still being received by the platform structure support member 42.

When the platform 50 is rotated, the shaft 40 remains stationary, however, the ring gear 62 rotates. As shown, when the platform 50 is rotated, the ring gear 62 rotates in the same direction. The ring gear 62 rotates when the platform 50 is rotated due to interaction of the planetary gear 54 with the gear 56 on the shaft 40 and the ring gear 62. Since the planetary gear 54 is carried by the platform 50, the gear 54 will move with platform 50. Further, since the planetary gear 54 is meshed with gear portion 58 and the teeth 64 on ring gear 62, the movement of planetary gear 56 with the platform produce the aforementioned rotation of the ring gear 62. Preferably, the ring gear 62, planetary gear 54 and other elements of the device 10 are sized and geared such that the ring gear 62 rotates one and one-fifth the speed at which the platform 50 rotates; however, this, of course, is not imperative. Preferably, as discussed, the stem 52 on the platform 50 keeps the planetary gear 54 from moving linearly relative to the platform 50. The shaft 40 remains stationary when the platform 50 is rotated since, preferably, the rotation of the platform 50 does not overcome friction contained within the gear box assembly of the device 10. Alternatively, the shaft 40 can be held in place while the platform 50 is rotated by using, for example, the tool 84 as discussed hereinabove.

By rotating the platform 50 without rotating the shaft 40 nor having the directing member 30 extend or retract, the platform 50 can be rotated without the headlamp reflector 12 changing position. As shown in FIG. 7, when the platform 50 is rotated, the ring gear 62 rotates. Since the ring gear 62 has indicia 70 thereon which cooperates with the pointer 74 on the platform 50, it is possible to rotate the platform 50 to cause the indicia 70 and 72 on the ring gear 62 and the platform 50 to indicate a zero position of the directing member 30, and therefore the position of the headlamp reflector 12.

In summary, the shaft 40 of the device 10 can be rotated to direct the headlamp reflector 12 to a desired position whereby the headlamp beam is correctly aimed, and then the platform 50 and/or the ring gear 62 can be rotated causing the indicia 70 on the ring gear 62 and the indica 72 on the platform 50 to indicate this desired or zero position of the headlamp reflector 12. Subsequently, if the headlamp reflector 12 moves, the directing member 30 of the device 10 moves causing the indicia 70 on the ring gear 62 and the indicia 72 on the platform 50 to provide a visual indication that the directing member 30 has moved, and therefore that the headlamp reflector 12, to which the directing member 30 is connected, is no longer in the desired position. The shaft 40 of the device 10 then can be rotated to extend or retract the directing member 30 in order to direct the headlamp reflector 12 to the desired position, which will be indicated when the indicia 72 and the pointer 74 indicate the zero position or alignment. The desired position of the headlamp reflector 12 can be obtained by rotating the shaft 40 until the indicia 70 on the ring gear 62 and the pointer or indicia 74 on the platform 50 to indicate that the headlamp reflector 12 is, once again, at the desired position.

While a preferred embodiment of the present invention is shown and described, it is envisioned that those skilled in the art may devise various modifications of the present invention without departing from the spirit and scope of the appended claims. For example, indicia on the platform 50 and/or the ring gear 62 may be utilized which is distinguishable from that which is depicted and described herein. Of course, the invention is not intended to be limited by the foregoing disclosure.

The invention claimed is:

1. A directing and indicating device for directing an automotive headlamp reflector to a desired position and indicating a variance in the actual position of the headlamp reflector from the desired position, said directing and indicating device comprising:

a directing member engageable with the automotive headlamp reflector;

a rotatable shaft in operative communication with said directing member for moving said directing member in order to direct the automotive headlamp reflector when said directing member is engaged with the automotive headlamp reflector;

a rotatable platform disposed proximate said shaft;

gear structure on said shaft;

a planetary gear engaged with said gear structure on said shaft;

a ring gear engaged with said planetary gear; and indicia for indicating a position of said ring gear with relation to a position of said platform in order to indicate the variance in the actual position of the automotive headlamp reflector from the desired position whereby movement of said directing member causes said ring gear to rotate relative to said platform, said platform, said planetary gear, said ring gear and said gear structure on said shaft being configured such that rotation of said platform relative to said ring gear when said ring gear is engaged with said planetary gear and said planetary gear is engaged with said gear structure on said shaft causes said indicia to change an indication of the position of said ring gear with relation to the position of said platform without there resulting substantial rotation of said shaft.

2. A directing and indicating device as set forth in claim 1, wherein said directing member comprises a reciprocatable arm connectable to said automotive headlamp reflector.

3. A directing and indicating device as set forth in claim 1, wherein said platform has planetary gear mounting means thereon for said planetary gear for joint movement of said planetary gear with said platform.

4. A directing and indicating device as set forth in claim 1, wherein said ring gear has gear teeth directed inwardly of said ring gear, wherein said planetary gear has gear teeth directed outwardly from a center of said planetary gear, and wherein said gear teeth of said ring gear are configured such that said gear teeth of said ring gear mesh with said gear teeth of said planetary gear when said ring gear is engaged with said planetary gear.

5. A directing and indicating device as set forth in claim 1, wherein said planetary gear has gear teeth pointed away from a center of said planetary gear, and wherein said gear teeth of said planetary gear are meshed with said gear structure on said shaft.

6. A directing and indicating device as set forth in claim 1, wherein said indicia for indicating a position of said ring gear with relation to a position of said platform comprises indicia on said ring gear and said platform.

7. A directing and indicating device as set forth in claim 6, wherein said indicia on said ring gear comprises an indicator scale and wherein said indicia on said platform comprises a pointer.

8. A directing and indicating device as set forth in claim 1, wherein said ring gear rotates relative to said platform when said platform is rotated.

9. A directing and indicating device as set forth in claim 8, wherein said ring gear rotates at about one and one-fifth the speed at which said platform rotates.

10. A directing and indicating device as set forth in claim 8, wherein said platform has holding means thereon for applying a rotational force to said platform.

11. A directing and indicating device as set forth in claim 1, wherein said ring gear rotates relative to said platform when said shaft is rotated.

12. A directing and indicating device as set forth in claim 11, wherein said ring gear rotates in a direction which is opposite to a direction in which said shaft is rotated.

13. A directing and indicating device as set forth in claim 12, wherein said platform remains stationary upon rotation of said shaft.

14. A directing and indicating device as set forth in claim 13, further comprising an O-ring in retentive communication with said platform, said O-ring holding said platform stationary while said shaft is rotated.

15. A directing and indicating device as set forth in claim 11, wherein said ring gear remains engaged with said planetary gear upon said shaft being rotated.

16. A directing and indicating device as set forth in claim 1, wherein said ring gear is coaxial with said shaft.

17. A directing and indicating device as set forth in claim 1, further comprising a retaining ring configured relative to said shaft such that said retaining ring is slidable onto said shaft for keeping said ring gear engaged with said planetary gear.

18. A directing and indicating device for directing an automotive headlamp reflector to a desired position and indicating a variance in the actual position of the automotive headlamp reflector from the desired position, said directing and indicating device comprising:

a reciprocatable member connectable to the automotive headlamp reflector;

a rotatable shaft in operative communication with said reciprocatable member for reciprocating said member in order to direct the automotive headlamp reflector when said member is connected to the automotive headlamp reflector;

a rotatable platform coaxial with said rotatable shaft, said rotatable platform having a stem thereon;

a gear on said rotatable shaft;

a planetary gear having gear teeth and mounted on said stem on said platform thereby mounting said planetary gear from movement within said platform, wherein said gear teeth of said planetary gear are meshed with said gear on said rotatable shaft;

a ring gear having radially inwardly directed gear teeth, said gear teeth of said ring gear configured such that said gear teeth of said ring gear mesh with said gear teeth of said planetary gear when said ring gear is engaged with said planetary gear;

indicia between said ring gear and said platform for indicating a position of said ring gear with relation to a position of said platform in order to indicate the variance in the actual position of the automotive headlamp reflector from the desired position, wherein reciprocation of said reciprocatable member causes said ring gear to rotate relative to said platform, wherein said ring gear rotates relative to said platform when said platform is rotated, wherein said ring gear rotates relative to said platform when said shaft is rotated, wherein said ring gear rotates in a direction which is opposite to a direction in which said shaft is rotated, wherein said platform remains stationary upon rotation of said shaft, said planetary gear, said ring gear and said gear structure on said shaft being configured such that rotation of said platform relative to said ring gear when said ring gear is engaged with said planetary gear and said planetary gear is engaged with said gear structure on said shaft causes said indicia to change an indication of the position of said ring gear with relation to the position of said platform without there resulting substantial rotation of said shaft.

19. A method for directing an automotive headlamp reflector to a desired position and for indicating the desired position, said method comprising:

providing a shaft in operative communication with a directing member, said directing member engaged with the automobile headlamp reflector; providing a rotatable platform disposed about said shaft with a first indicia thereon; providing planetary gearing arrangement engaged with said shaft and a second indicia bearing outermost gear member carried by, yet rotatable with respect to said platform; rotating said shaft causing said directing member to move and direct the automobile headlamp reflector to the desired position, with rotation of said shaft causing said outermost gear member to rotate relative to said platform; and after attaining a desired orientation for said reflector, rotating said platform in relation to said outermost gear member while said planetary gearing arrangement is engaged with said shaft and said outermost gear member; and while rotating said platform in relation to said outermost gear member, refraining from substantially rotating said shaft, wherein said planetary gearing arrangement is configured such that rotation of said platform relative to said outermost gear member causes said first and second indicia to change an indication without there resulting substantial rotation of said shaft.

20. A method for determining a variance in an actual position of an automotive headlamp reflector from a desired position and for directing the automotive headlamp reflector to the desired position, said method comprising:

reading indicia between a ring gear and a rotatable platform that indicates that said ring gear has rotated relative to said platform thereby further indicating the variance in the actual position of the automotive headlamp reflector from a desired position, said ring gear being part of a planetary gear arrangement including a gear component on a rotatable shaft and a planetary gear engaged with said gear component on said rotatable shaft and said ring gear, said platform disposed about said shaft and said shaft being in operative communication with a directing member, said directing member engaged with the automotive headlamp reflector, wherein movement of reflector member produces movement of said directing member which in turn causes said ring gear to rotate relative to said platform in order to indicate said variance in the actual position of said automotive headlamp reflector from said desired position; and rotating said shaft and therefore also rotating said planetary gear engaged with said gear component on said rotatable shaft and said ring gear engaged with said planetary gear to bring said indicia into alignment thus moving said directing member and causing said directing member to direct the automotive headlamp reflector to the desired position.

* * * * *